United States Patent Office 2,947,340
Patented Aug. 2, 1960

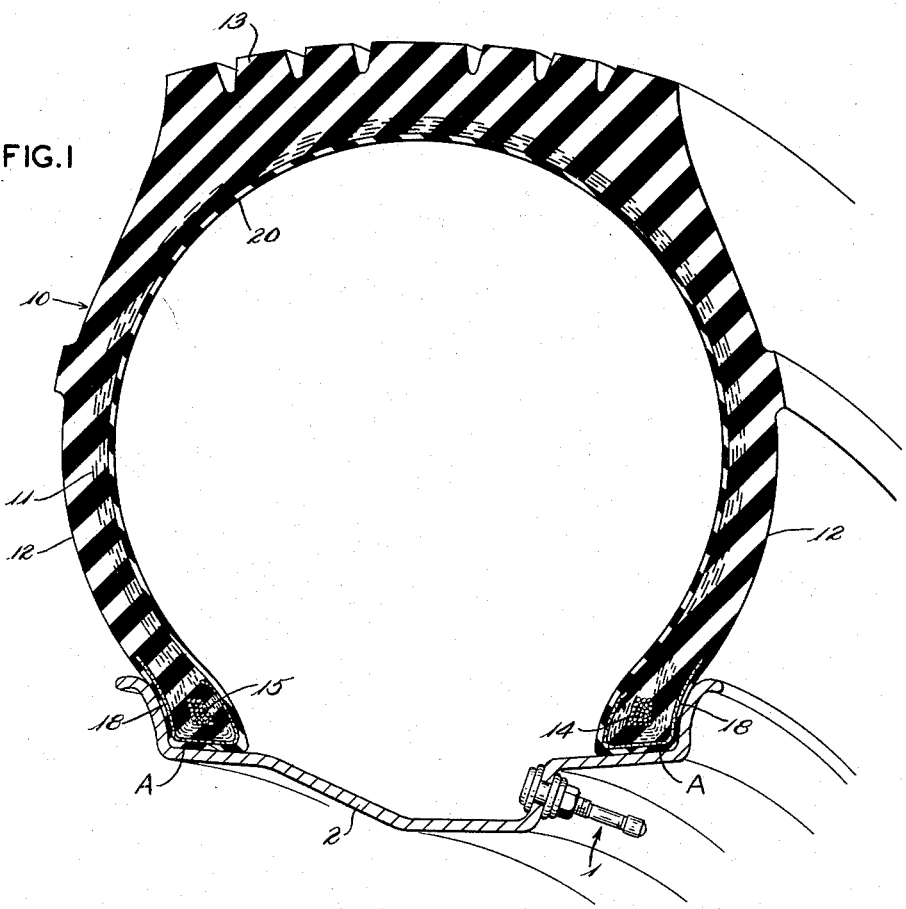
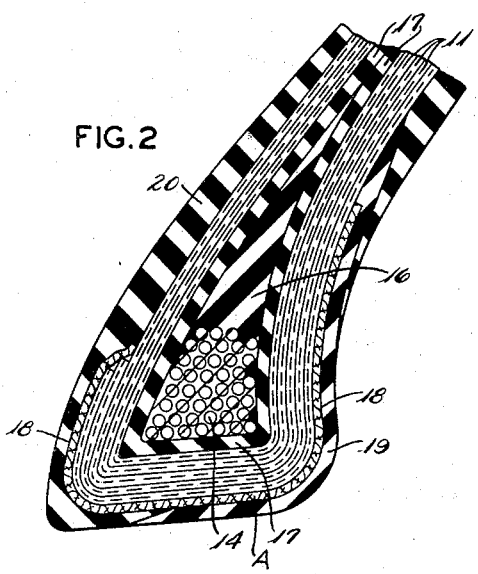
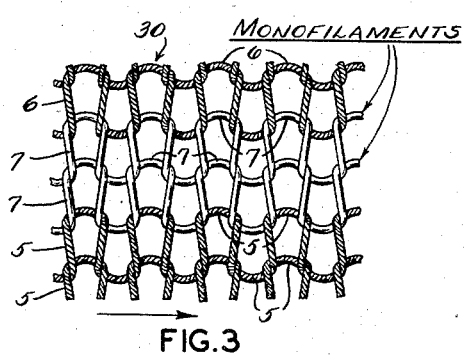

2,947,340

TUBELESS TIRE AND CHAFER THEREFOR

Robert W. French, Cuyahoga Falls, Ohio, assignor to The Firestone Tire & Rubber Company, Akron, Ohio, a corporation of Ohio Filed June 21, 1957, Ser. No. 667,160

5 Claims. (Cl. 152—362)

This invention relates to a pneumaic tire of the tubeless type and has as its broad object the provision of means for preventing the inflationary air of a tire from channeling through the yarns or cords of the chafer fabric strip to the atmosphere or into the tire body.

Heretofore, resort to various expedients has been had to prevent air leaking around the tire beads but none of these have been completely satisfactory. One such expedient has been the forming of continuous circumferentially extending ribs of rubber upon the tire beads. Another expedient has been to form a flexible tire bead toe of such nature that when the tire is inflated, the toe will flutter against the tire rim and thereby act as a valve to seal air within the tire. Further expedients have been the making of tight fit between the radially inner surface of the tire bead and the tire rim and the employing of sealing materials such as viscous rubber, caulking material and other types of sealing materials disposed between the tire and the tire rim.

While some of these and other expedients, not mentioned, have proven more or less successful, it has been found that leakage of the inflationary air into the tire chafers persists and has permitted said air to escape to the atmosphere or to enter the cords of the chafer fabric or the ply fabric where it often causes sidewall blistering or ply separation. To overcome airleaks through the tire chafer, resort has been had to the use of well known knitted tire fabric, so placed as to avoid any continuous portion of its elements extending laterally from edge to edge of the chafer strip. The knitted fabric provides certain obvious and well known desirable characteristics for use as chafer fabric, such for example, as two-way flexibility which facilitates folding the chafer about the edges of the bead portions of a tire as well as affording a cost advantage by eliminating bias-cutting. It is well known to use knitted yarns or cords to reinforce rubber-fabric articles such as hose or tires; however, it has been found that knitted fabric composed of multifilament yarns or cords used for tire bead chafers, as just explained, permits the passage of air transversely through the fabric of the chafer when one or more yarns or cords become exposed to the inflationary air of the tire. The communication of air from one rubberized yarn or cord to the adjacent yarn or cord in the knitted fabric occurs at the contact point of the interlooping of the yarn or cord. As a practical matter it has been found that the knitted yarn or cord cannot be rubberized to completely insulate the yarn in the loops against contact and at this point of contact the air wicks or flows through same.

One form of the present invention accordingly employs a knitted fabric chafer composed of monofilaments as a means of preventing the passage of air transversely through the chafer, while at the same time utilizing the advantages characteristics of two-way stretchable knitted fabric. Another form of the invention utilizes the further advantageous rubber-bonding and better abrasion-resistance characteristics of multi-filament yarn, in a knitted chafer structure, combined with one or more knitted courses of monofilament threads or two or more spaced courses of monofilament threads to eliminate any continuity of air passageways through the yarns laterally through the chafer, which might transmit inflationary air from the inside of the chafer to the outside of the tire or to the cord body of the tire.

A general object of the invention is to provide an open-bead type pneumatic tubeless tire comprising a chafer strip of knitted yarn or cord so constructed and applied to a tire that inflationary air that may contact one or more yarns or cords of the chafer fabric in the region of the toe or base of the tire bead will be blocked off from contact with adjacent yarns or cords of the fabric, thereby preventing such air from leaking to the atmosphere or into the tire body.

An object of the present invention is to provide a novel chafer strip for a tubeless tire which chafer is preferably composed of knitted fabric comprising yarns or cords of cotton, rayon, nylon or other suitable natural or synthetic multifilaments knitted with a course of monofilament thread, or two or more spaced courses of monofilament treads separating courses of multifilament yarns or cords, which chafer may be resin or rubber-impregnated, skim-coated, calendered or otherwise processed, and applied to the tire without requiring bias-cutting, owing to the two-way stretchability of the knitted fabric.

Another object of the present invention is to provide a chafer strip for a tubeless tire which chafer is preferably knit or otherwise fabricated of air-impervious material in the form of monofilaments and which chafer may be processed in the stock preparation departments of a tire factory, in a conventional manner, and be applied to the tire without special handling, said chafer strip serving its purpose in the tire fully as well or better than chafer strips of the prior art.

The present invention is illustrated in relation to a tubeless tire of the type having a relatively air-impermeable inner lining but the invention is not to be limited to any particular type of tire.

These and other objects will be apparent from the following description, reference being had to the drawings in which:

Fig. 1 is a fragmentary perspective view partly in section of a molded and vulcanized tire embodying the present invention, the tire being shown as it appears in operative position on a tire rim;

Fig. 2 is an enlarged fragmentary sectional view of a bead portion of the tire shown in Fig. 1, showing in detail the arrangement of tire components; and Fig. 3 is a fragmentary plan view of knitted chafer fabric employed in the present invention.

Referring to Fig. 1, a tire 10 is shown mounted upon rim 2. A conventional inflating valve 1 is mounted in fluid-tight connection with tire rim 2.

Referring to Figs. 1 and 2 of the drawing, there is shown a tubeless tire 10 which comprises tire body plies 11, sidewall 12, tread 13, inextensible bead portions 14 and 15, bead filler 16, bead reinforcing strip 17, chafer strip 18, abrasion-resisting rubber compound cover strip 19 and an air-impervious liner 20. It is to be understood that the particular arrangement of material shown is for illustrative purpose and the same may be modified without departing from the spirit of the invention.

In the embodiment of the invention shown in Fig. 1 the chafer 18 comprises a knitted fabric 30 as detailed, for example in Fig. 3, which, as will later be explained, may be composed of courses of monofilaments or a combination of courses of multifilament yarns and courses of monofilaments.

The term "yarn," as used throughout the specification and claims, is understood to mean a single ply or multiply yarn of multifilaments, as well as a cabled cord construction thereof.

Referring now to Fig. 3 in detail, yarns 5 and 6 are multifilament yarns of any suitable material, such, for example, but without limitation, as cotton, rayon or nylon, Dacron, vinyl resin, saran, etc. The term "Dacron" is a trade name for synthetic plastic having a composition:

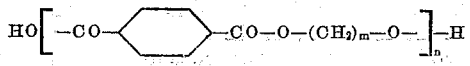

wherein $m$ represents an integer within the range of 2 to 10, and $n$ represents a large number approximately in the range of 50 to 200. This general class of material is described in United States Patent No. 2,465,319. Such multifilament yarns have the property of being highly resistant to abrasion, and are also capable of being thoroughly bonded to the rubber layers and other fabric plies of the tire. However, as explained below, such rubberized multifilament yarns are found to wick, transmit or channel air from the inside of the tire casing to the outside of the tire or between the plies of the tire so as to cause leakage and ply separation as will be explained below. It is therefore desirable to interpose one or more rows or courses of knitting of monofilament threads, or plurality of such courses of threads, in between a plurality of courses of multifilament yarns to serve as barriers to such transmission of air to the chafer strip.

Courses or threads 7 are composed of threads of single monofilaments of nylon or other more or less comparable impervious materials, such as Dacron, vinyl resin or saran. Fabric 30 is preferably tubular or flat-knitted to a width for efficient rubberizing by a rubber calender operation, the courses of yarns 5 and 6 and threads 7 each extending in a serpentine path in a general longitudinal direction with respect to the fabric. The courses of the threads 7 are disposed at spaced intervals laterally of the fabric relative to the width of a chafer strip of which they are to be a part, so that the fabric, after it has been rubberized, may be slit into strips lengthwise of the fabric of proper width for chafers with each strip including threads 7 disposed intermediate the edges of the strips or chafers. It is to be understood that yarns 5 and 6 and threads 7 may be knitted so that the courses extend laterally of the fabric, if desired, in which case the slitting or cutting just explained would be made cross-wise of the fabric but would provide the same relations of yarns 5 and 6 and threads 7 relative to the width of the chafer strip, namely, that the courses of the knitted yarns and monofilament threads will extend lengthwise the cut strips, as indicated by the arrow in Fig. 3. The loops or wales of the knitted structure extend transversely of the width of the cut chafer strip, while the yarns or threads connecting the loops extend lengthwise the strip, so that the courses of the knitting extend circumferentially of the tire bead when the chafer strip is incorporated in a tire.

Before the cutting or slitting of fabric 30, it is rubberized by impregnating, calendering and/or skim-coating so as to provide a rubber coating which normally tends to prevent the passage of air from chafer 18 to the plies. However, perfect impregnation is impossible and the area of the tire bead that contacts the rim base and side flange is subjected to severe abrasion in service which sometimes chafes through the tire beads until the chafer fibers are exposed. Sometimes this chafing deteriorates the rubber between the chafer fabric yarns and fibers and the ply fabric, in which event before the present invention, air in the chafer would pass into the body plies of the tire and cause premature failure of the tire.

After the rubberized fabric has been cut into strips of proper width it is incorporated into tire 10 as a chafer in the usual manner, the knitted construction providing a more flexible fabric than chafer fabric heretofore in common use. The two-way flexibility and stretchability of the fabric facilitate applying the chafers in a wrinkle-free condition about the bead portions of the tire. The invention contemplates providing more than one barrier course of monofilament threads to a chafer, but prefers one or more such courses disposed in the region of the base of the bead adjacent point "A" as shown in Fig. 2.

The barrier feature provided by the air impervious monofilament threads 7 makes possible its use in combination with multifilament yarns of cotton, rayon or other highly abrasion-resistant materials, such multifilament materials having the additional desirable characteristic of affording a superior rubber bond.

In the operation of the tire in the form of the invention embodying the barrier threads 7, air that comes in contact with the chafer fabric 30 on the tire bead toe side of point "A" (see Fig. 2) can wick or flow through the multifilament yarns of the chafer only to the barrier yarns 7 at point "A" where it is cut off from the rest of the chafer.

Referring again to Fig. 3 it is to be understood that the invention also contemplates the use of tire bead chafer strips made by knitting the entire body of fabric 30 of yarns composed of single monofilaments of air-impervious material. By providing a knotted fabric 30 consisting either, of threads all, of air-impervious monofilaments or combination monofilament multifilament construction, the present invention provides a chafer for a tubeless tire that is an improvement of prior chafers in that the two-way stretchable knitted fabric is easier to fold about the different diameters of the bead portions of a tire during fabrication of the latter without puckering the chafer fabric and provides a chafer that is impervious to the transmission therethrough of inflationary air, and a chafer which eliminates the step of bias-cutting the chafer strip.

The new and improved tire construction has been explained in connection with a chafer comprising knitted fabric in which a barrier to air passage laterally of a chafer is formed by a course or courses of air-impervious material threads disposed intermediate the margins of the chafer whose edge portions are composed of air-permeable courses of yarns which have superior rubber bonding and abrasion-resistant properties; and a modification wherein all the threads of the fabric of the chafer are composed of single monofilaments of air-impervious material. Such modification and others that will be apparent to those familiar with the art are within the contemplation of the invention.

The detailed description of the particular embodiments of the invention illustrated and described herein is not to be construed as limiting the invention thereto. The invention includes all patentable novelty residing in the foregoing description and the accompanying drawing.

I claim:

1. A tubeless tire comprising a bead having a chafer strip of rubberized knitted fabric disposed thereabout, the courses of knitted loops of the fabric strip extending in a serpentine path in a general direction longitudinally of the fabric strip and circumferentially about the bead of the tire, the courses of the knitted fabric strip being arranged in alternate groups, said groups being alternately composed of courses of multifilament yarns and courses of monofilaments of air-impervious material, said groups of monofilament courses being disposed intermediate the groups of courses of multifilament yarns and intermediate the inner and outer margins of the tire bead, thereby providing a barrier to the passage of inflationary air transversely through said chafer.

2. A tubeless tire comprising a bead having a chafer strip of rubberized knitted fabric disposed thereabout, the courses of knitted loops of the fabric strip extending in a serpentine path in a general direction longitudinally of the fabric strip and circumferentially about the bead of the tire, the courses of the knitted fabric strip being alternately composed of multifilament yarns and monofilaments of air-impervious material, said monofilament courses being disposed intermediate the courses of multifilament yarns and intermediate the inner and outer margins of the tire bead thereby providing a barrier to the passage of inflationary air transversely through said chafer from said inner margin to said outer margin of said bead.

3. A pneumatic tubeless tire of the open-bead type comprising a pair of spaced inextensible bead portions at its radially inner edges, said bead portions having chafers disposed thereabout each consisting of a knitted strip of fabric embedded in rubber, said fabric consisting of knitted courses of monofilaments of air-impervious material disposed intermediately between groups of knitted courses of multifilament yarns, one lateral marginal edge of said strip comprising courses of multifilament yarns terminating adjacent the inside of the tire cavity, the opposite lateral marginal edge of said strip comprising courses of multifilament yarns terminating adjacent the outside of the bead area of the tire, said marginal edges extending circumferentially about said tire bead portions, and one or more of said courses of monofilaments extending circumferentially about said tire bead portions between said marginal edge portions.

4. A pneumatic tubeless tire comprising a body formed of a plurality of plies of suitable material, a pair of beads at the radially inner edges of said body, and a chafer extending about the radially inner and laternally outer portions of each said bead, said chafer comprising a knitted fabric having courses of multifilament yarn and at least one course of an air-impervious monofilamentary material, said course of monofilamentary material extending longitudinally of said bead and confined to the area intermediate the inner and outer margins of said bead and separating courses of said multifilament yarn, whereby inflationary air is barred from passing to the atmosphere from within said tire.

5. An open-beaded pneumatic tubeless tire comprising a chafer strip disposed about each bead of said tire, said chafer strip being composed of fabric comprising a sheet of knitted groups of parallel courses of multifilament yarns, with at least one course of an air-impervious monofilamentary materal interposed between said groups, said course of monofilamentary material being confined to the area intermediate the inner and outer margins of said bead and extending longitudinally of said bead, whereby inflationary air is barred from passing to the atmosphere from within said tire.

References Cited in the file of this patent

UNITED STATES PATENTS

| | | |
|---|---|---|
| 835,808 | Bragg | Nov. 13, 1906 |
| 2,771,757 | Burleson et al. | Nov. 27, 1956 |

FOREIGN PATENTS

| | | |
|---|---|---|
| 1,084,382 | France | July 7, 1954 |

UNITED STATES PATENT OFFICE

CERTIFICATE OF CORRECTION

Patent No. 2,947,340         August 2, 1960

Robert W. French

It is hereby certified that error appears in the printed specification of the above numbered patent requiring correction and that the said Letters Patent should read as corrected below.

Column 2, line 22, for "treads" read -- threads --; column 4, line 22, for "knotted" read -- knitted --; column 5, line 26, for "laternally" read -- laterally --.

Signed and sealed this 10th day of January 1961.

(SEAL)
Attest:

KARL H. AXLINE         ROBERT C. WATSON
Attesting Officer         Commissioner of Patents